United States Patent [19]
Wichner et al.

[11] Patent Number: 5,239,936
[45] Date of Patent: Aug. 31, 1993

[54] LOW-TEMPERATURE ASHING OF HAZARDOUS PLASTIC WASTE

[75] Inventors: Robert P. Wichner, Oak Ridge; Roger D. Spence, Clinton; Ivan L. Morgan, Harriman, all of Tenn.; Helen W. Jermyn, Panama City, Fla.

[73] Assignee: The United States of America as represented by the Secretary of the Air Force, Washington, D.C.

[21] Appl. No.: 918,748

[22] Filed: Jul. 27, 1992

Related U.S. Application Data

[62] Division of Ser. No. 816,903, Jan. 3, 1992, Pat. No. 5,167,711.

[51] Int. Cl.⁵ .............................................. B09B 3/00
[52] U.S. Cl. ................................... 110/236; 106/705; 110/210; 110/222; 110/232; 110/245; 110/259; 588/228
[58] Field of Search .............. 110/236, 245, 222, 259, 110/210, 211, 347, 232, 346; 106/405, 705; 588/228, 234, 280

[56] References Cited

U.S. PATENT DOCUMENTS

| | | | |
|---|---|---|---|
| 4,116,705 | 9/1978 | Chappell | 106/90 |
| 4,375,986 | 3/1983 | Pichat | 106/85 |
| 4,763,585 | 8/1988 | Rickman et al. | 110/232 X |
| 5,035,189 | 7/1991 | Lunsford | 110/226 X |
| 5,069,145 | 12/1991 | Crooke | 110/232 X |

FOREIGN PATENT DOCUMENTS 149501 7/1985 European Pat. Off. .

OTHER PUBLICATIONS

"Fixation and Solidification of Wastes", by J R Conner, Chemical Engineering, Nov. 10, 1986, pp. 79–84.

Primary Examiner—Edward G. Favors
Attorney, Agent, or Firm—Bobby D. Scearce; Thomas L. Kundert

[57] ABSTRACT

System and method for low temperature treatment of organic wastes containing potentially toxic concentrations of metals is described which comprises forming the waste material into pellets of preselected size, mixing the pellets with inert material, incrementally heating the mixture in air from about 200° C. to about 600° C. in order to oxidize the pellets to the corresponding ash containing the metals, collecting the ash, and combining the ash with inert material and binder to form a solidified compact for disposal.

9 Claims, 4 Drawing Sheets

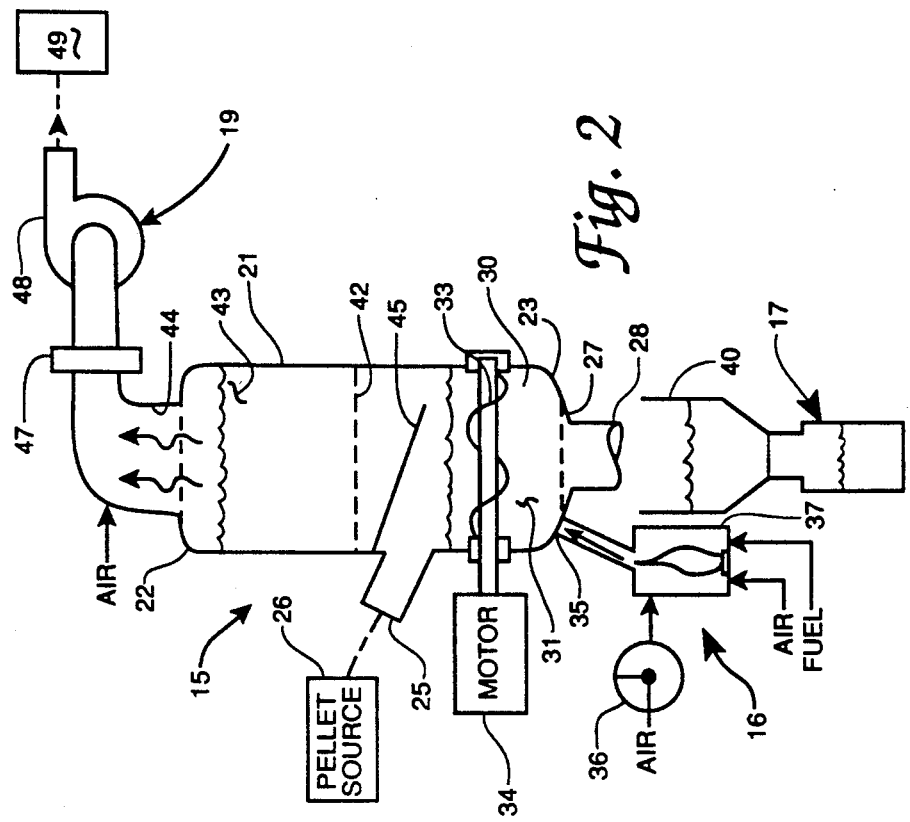
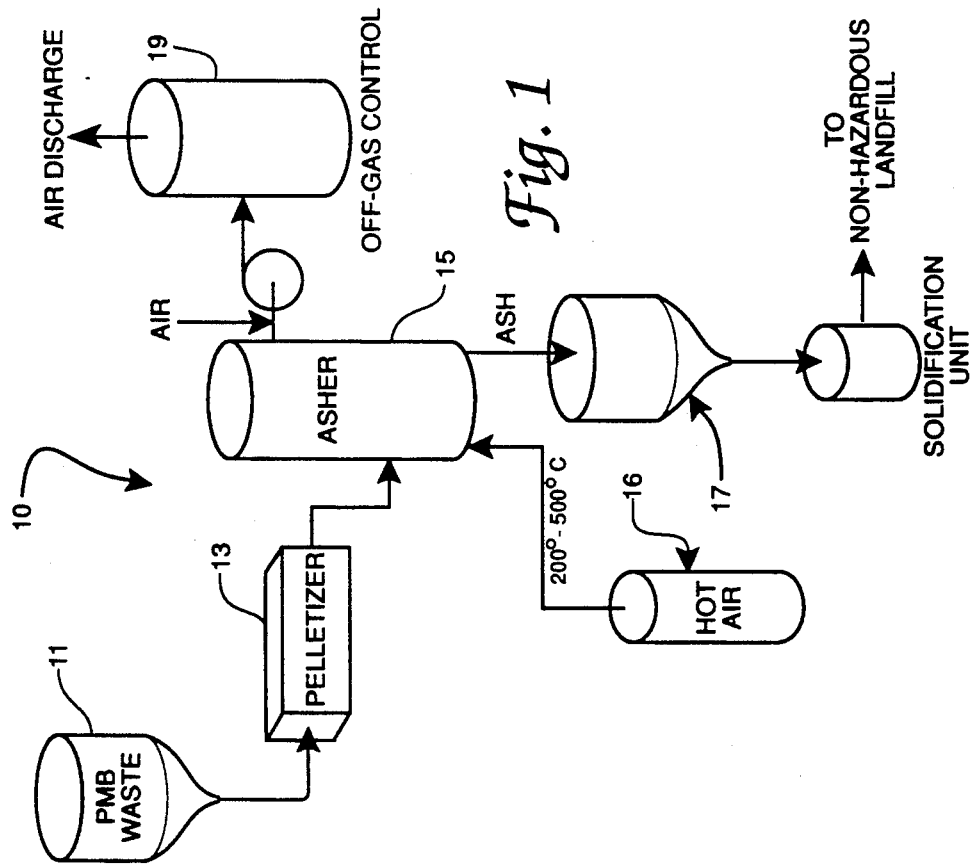

LOW-TEMPERATURE ASHING OF HAZARDOUS PLASTIC WASTE

RIGHTS OF THE GOVERNMENT

The invention described herein may be manufactured and used by or for the Government of the United States for all governmental purposes without the payment of any royalty.

This is a division of application Ser. No. 07/816,903 filed Jan. 3, 1992 U.S. Pat. No. 5,167,711.

BACKGROUND OF THE INVENTION

The present invention relates generally to systems and methods for disposal of materials containing toxic metals, and more particularly to system and method for disposal of plastic media blasting materials containing toxic metals from paint stripping operations.

Solid wastes produced by stripping paint from painted surfaces may be classified by the Environmental Protection Agency (EPA) as hazardous under the Resource Conservation and Recovery Act (RCRA) because of excessive concentrations of toxic metals in the paint pigments. The procedure recommended by the EPA for treating waste containing hazardous concentrations of metals includes chemical stabilization and solidification of the waste. However, because paint stripping waste characteristically contains only small amounts of metal (about 1 wt %), the balance being organic paint polymer (vehicle) and paint stripping medium, solidification and stabilization of untreated waste costs about 100 times more than necessary based on metal content alone. When a plastic medium is used to strip paint, the bulk of the waste is organic which may be incinerated but for the accompanying release of airborn metal vapor or particulate matter, which release to the environment is undesirable.

The invention provides system and method for disposing of paint stripping waste generated from a plastic media blasting (PMB) process or other organic waste containing excessive concentrations of toxic metals according to RCRA, wherein the waste is reduced in volume by controlled heating at temperatures high enough to oxidize the organic portion of the waste but low enough to avoid vaporization of the metal compounds in the paint pigments followed by stabilization of the resulting ash (principally metal oxides) into a cementitious compact. Laboratory tests on the method show that a 95% or greater reduction of waste volume may be achieved, which may reduce solidification and stabilization costs by a factor of 20 or more. No detectable toxic metal vapors or particulates are released to the atmosphere during the process.

It is therefore a principal object of the invention to provide system and method for treating organic material containing toxic metals.

It is a further object of the invention to provide system and method for low temperature ashing of plastic or other organic waste containing hazardous concentrations of toxic metals.

It is a further object of the invention to provide system and method for disposal of plastic blasting media waste from paint stripping operations.

It is a further object of the invention to provide system and method for weight and volume reduction of paint stripping waste.

It is another object of the invention to provide system and method for stabilization and disposal of hazardous metals contained in paint stripping or other organic waste.

These and other objects of the invention will become apparent as a detailed description of representative embodiments proceeds.

SUMMARY OF THE INVENTION

In accordance with the foregoing principles and objects of the invention, system and method for low temperature treatment of organic wastes containing potentially toxic concentrations of metals is described which comprises forming the waste material into pellets of preselected size, mixing the pellets with inert material, incrementally heating the mixture in air from about 200° C. to about 600° C. in order to oxidize the pellets to the corresponding ash containing the metals, collecting the ash, and combining the ash with inert material and binder to form a solidified compact for disposal.

DESCRIPTION OF THE DRAWINGS

The invention will be more clearly understood from the following detailed description of representative embodiments thereof read in conjunction with the accompanying drawings wherein:

FIG. 1 is a diagram of the essential components of a system according to the invention and useful in practicing the method thereof for batch operation;

FIG. 2 is a view in axial section of a low temperature ashing device representative of the invention and configured for batch operation;

DETAILED DESCRIPTION

Figure 3A:
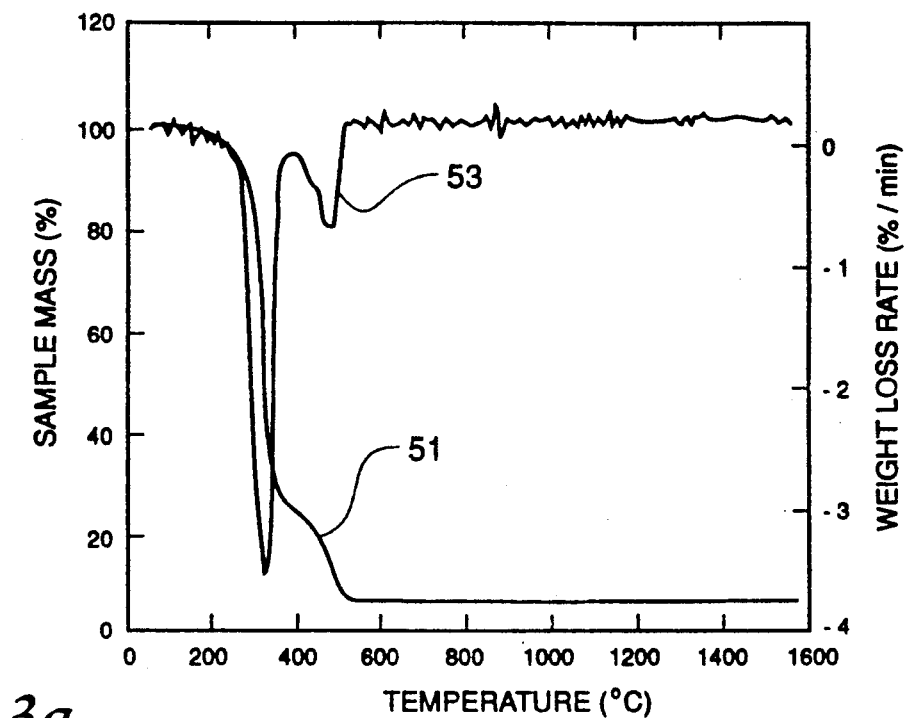
FIGS. 3a and 3b show thermogravimetric analysis (TGA) tests on type V and II PMB paint stripping wastes, respectively.

Waste generated in paint stripping operations using PMB material may have a wide range of compositions. The PMB material used in a stripping operation is generally one of five types, viz, polyester, urea formaldehyde, melamine formaldehyde, phenol formaldehyde, and polyacrylic. After use, the degraded PMB particles in the waste typically have size range of about $-60$ $+400$ mesh (about 38–250 microns). Paint vehicles in common use include polyurethane, epoxy and polyester polymers and may contain various pigments including chromates, oxides, molybdates, sulfates, sulfides and carbon. The dried (polymerized) paints generally contain concentrations of one or more of the toxic metals, barium, cadmium, chromium or lead, in excess of limits prescribed for wastes in the RCRA. As such, these wastes are designated as "hazardous wastes", and disposal must conform to regulations regarding such wastes. The paints contain about 6–20 wt % pigment with the remainder being vehicle. Waste generated by paint stripping operations using PMB may therefore comprise about 90 wt % PMB, 9 wt % paint polymer and 1 wt % pigment. Pigment and paint particles in the waste typically may have particle size as small as about 0.1 micron.

Referring now to FIG. 1, shown therein is a diagram of the essential components of system 10 according to the invention and useful in practicing the method thereof for batch operation. PMB paint stripping waste from source 11 thereof may first be formed into pellets of preselected size within pelletizer 13. Because the PMB waste is combustible and usually finely divided, it presents an explosion hazard upon heating in air. The pelletizing process provides uniformly sized feed material to low temperature asher device 15 and avoids an explosion hazard therein. Pelletization of the PMB waste material may be accomplished in any suitable manner appropriate for the (usually plastic) material which comprise the bulk of the waste. For example, pelletization may be accomplished by hot pressing or hot forming polyacrylic PMB waste into pellets at temperatures near the softening point (usually about 150°–200° C.) of the PMB material, or by heating the PMB waste material to melting and extruding the melt (including paint fines) into strands of preselected size followed by chopping or grinding the strands to selected pellet size. Pelletization of thermosetting PMB wastes (types other than polyacrylic) may be accomplished by mixing with polyacrylic waste or some other suitable thermoplastic material to serve as a binder. The invention herein contemplates a preferred pellet diameter range of about ¼ to ½ inch, however, because pelletization of the waste is not essential to the practice of the invention, but is an element of a preferred embodiment thereof, pellet size is not considered limiting of the invention. In a preferred embodiment, the pelletized waste is heated to an ash within device 15 using air preheated to about 200°–550° C. from heated air source 16. Ash from device 15 is solidified with cementitious material in solidification unit 17, the solidified compact being disposable in a non-hazardous landfill. Off-gases from device 15 are treated (burned) in off-gas control unit 19. The structure and operation of device 15, source 16, and units 17,19 are discussed in more detail below in relation to FIG. 2.

Referring now to FIG. 2, shown therein is a view in axial section of a demonstration low temperature asher device 15 representative of the invention and configured for batch type operation in reduction of PMB waste to ash. Demonstration device 15 includes a generally cylindrically shaped housing 21 having upper end 22 and lower end 23 and sized (about 15 inches diameter by 30 inches high) for accommodating PMB waste batch charges of about 100 kg. Means defining inlet port 25 provides an opening for insertion of pelletized PMB waste material from source 26 thereof including pelletizer 13. Grating 27 of about ¼-inch mesh size is disposed within and transverse of housing 21 near outlet 28 in lower end 23, and supports thereon a bed 30 of mineral agglomerate 31. In device 15, blast furnace slag of about ½-inch clinker size is used as mineral agglomerate 31. Mineral agglomerate 31 may be selected to correspond to the material used to solidify PMB ash and hazardous metals, so that degraded agglomerate 31 fines may form a part of a disposable solidified compact as discussed more fully below. Blast furnace slag has been shown to be highly useful in the practice of the invention in providing chemical stabilization for toxic metals in the solidified cementitious compact. Solids mixer 33 powered by motor 34 is disposed transverse of housing 21 within bed 30 for mixing and diluting the combustible PMB waste pellets with inert (non-combustible) mineral agglomerate 31 for controlled low temperature oxidation of the pellets (i.e. rapid burning does not occur) according to a principal feature of the invention.

Source 16 of heated air is disposed near housing 21 to provide heated air at controlled temperature of about 200° C. to about 600° C. to bed 30 through inlet 35 as suggested in FIG. 2. Source 16 may include pressurized air source 36 and a substantially conventional, temperature controllable heater 37.

In operation of device 15, a batch of pelletized PMB waste material is inserted into housing 21 and mixed with agglomerate 31 (about 10:1 weight ratio of inert to waste material) in bed 30. Bed 30 containing PMB waste and agglomerate 31 is heated gradually by heated air from source 16. Accordingly, heated air at about 200° C. is initially passed through bed 30 and the temperature of the air is gradually increased (about 5° to 10° C. per minute) to about 550° C. for substantially complete oxidation and/or volatilization of the waste pellets as discussed more fully below in relation to FIGS. 3a and 3b. Ash from the oxidation of the PMB waste and concentrated pigment material along with some agglomerate 31 fines are removed at outlet 28 through agitation by solids mixer 33, collected in receptacle 40, and combined in solidification unit 17 with an appropriate amount (in a ratio range from about 1:2 to 2:1) of cement based material and binding agents and compacted to a disposable solid in any suitable manner as would occur to the skilled artisan, the specific method and materials used not being limiting of the invention. Cement and various inert mineral materials, such as blast furnace slag, fly ash, other pozzolans or silica fume combined with water may be successfully used to form a solidified compact having concentrations of toxic metals which meet EPA non-hazardous landfill disposal requirements related to non-leachabilty of the metals from the compact.

Grating 42 (½-inch in the demonstration unit) is disposed within and transverse of housing 21 above port 25 for supporting packed bed 43 of mineral agglomerate such as blast furnace slag or crushed rock for trapping and condensing aerosols in the off-gas from the PMB waste oxidation process within bed 30 as just described. Off-gases from bed 30 may contain volatile organic compounds (VOCs), carbon dioxide, moisture, and other partially oxidized organics, such as carbon monoxide, hydrocarbons, alcohols and aldehydes and some particulate matter. Bed 43 provides a sorption surface on which certain constituents of the off-gases may be further oxidized and cooled, the remainder of the off-gases being exhausted through outlet 44 to off-gas control unit 19. Baffle 45 may be disposed just below bed 43 to restrict flow of certain aerosol materials, such as soot and degraded agglomerate particles into bed 43. Unit 19 may include suitable filters, such as HEPA filter 47 for removal of particulate matter, and blower 48 for assisting controlled airflow through housing 21 and for conducting off-gas to incinerator 49. Within incinerator 49, VOCs and intermediate combustion products (e.g. CO, hydrocarbons, alcohols and aldehydes) in the off-gases from packed bed 43 are burned. Unit 19 processes the off-gases to ensure that any discharge to the atmosphere meets regulatory standards, and may therefore otherwise include commercially available wet scrubbers, filters and after-burning devices.

Figure 3B:
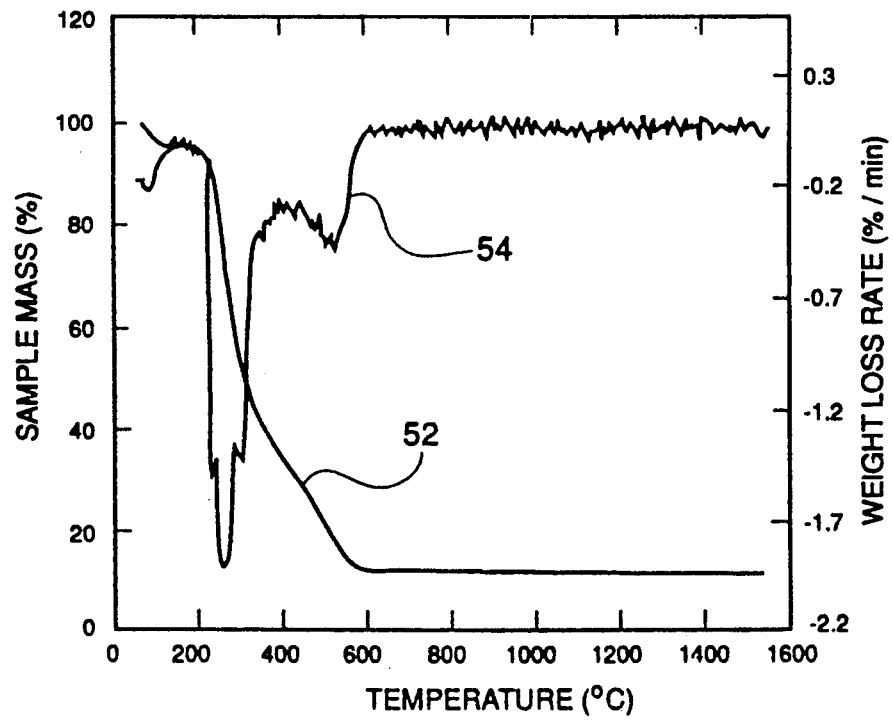

Referring now to FIGS. 3a and 3b, shown therein, respectively, are thermogravimetric analysis (TGA) tests on type V and II PMB wastes. In the TGA tests, samples of waste were heated gradually in air from about room temperature to about 1600° C. Curves 51 and 52 show the weight loss (in per cent of starting material) as a function of temperature. Ashing is substantially complete at about 500° C. with about 5 wt % residue for the type V waste and at about 580° C. with about 10 wt % residue for the type II waste. Curves 53 and 54 show that weight loss occurs prominently at about 300° C. and 480° C. for type V waste and at about 270° C. and 550° C. for type II waste. It is noted that these data may be typical of the various PMB waste types I to V.

Figure 4:
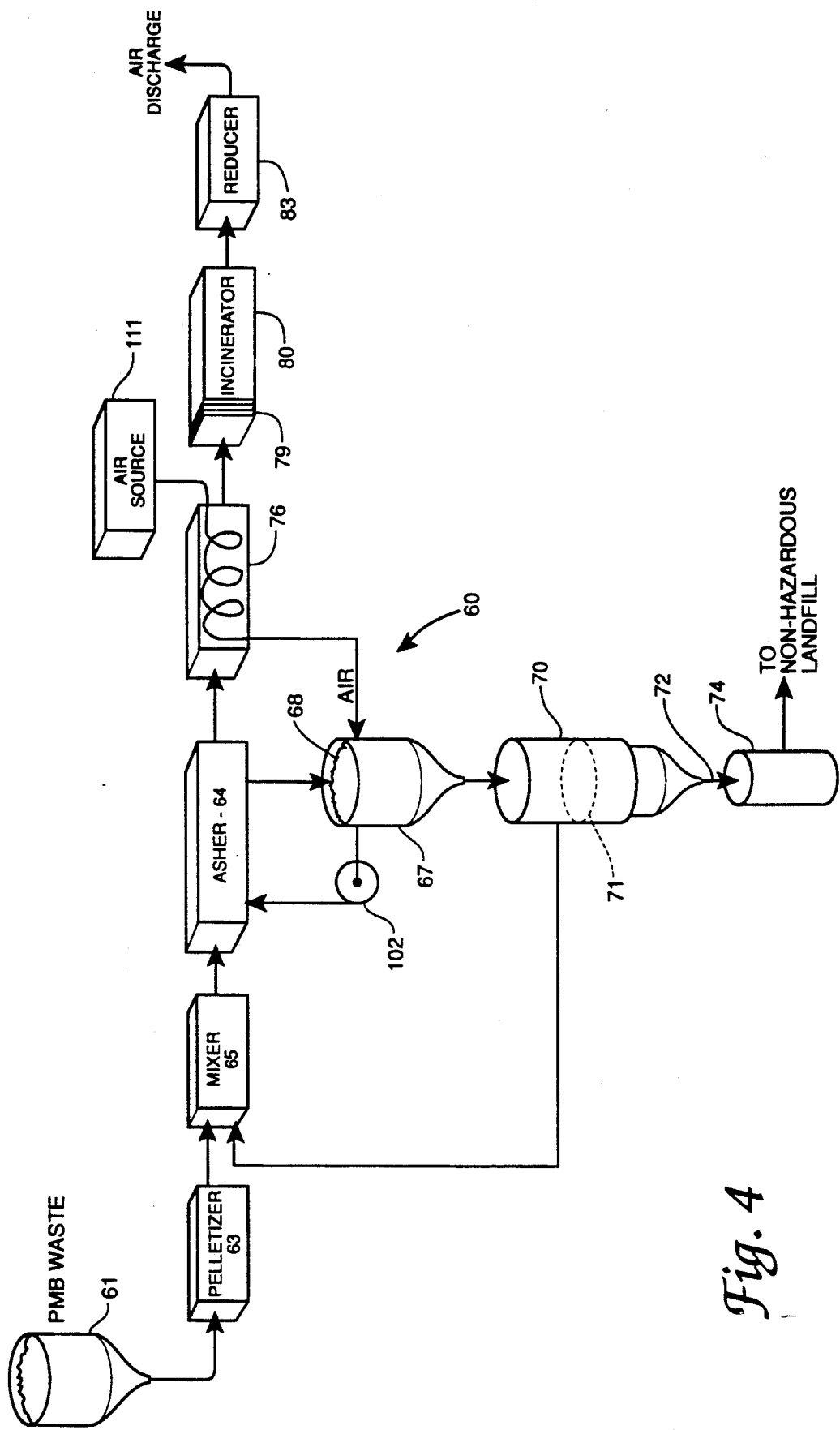
FIG. 4 shows a diagram of the essential components of a system according to the invention and useful in practicing the method thereof for continuous operation.

Referring now to FIG. 4, shown therein is a diagram of the essential components of representative system 60 according to the invention and useful in practicing the method thereof for continuous operation. PMB waste from source 61 is formed into pellets of preselected size within pelletizer 63, similarly as within pelletizer 13 of FIG. 1, except that pelletizer 63 preferably operates substantially continuously in order to feed continuously operating low temperature asher 64 the structure and operation of which is described more fully below in relation to FIG. 5. Mixer 65 may be disposed between pelletizer 63 and asher 64 in order to premix PMB waste pellets with inert material such as that used as agglomerates 31 in system 10. Inert material in the form of blast furnace slag agglomerate about the same size ($\frac{1}{2}$-inch) as the PMB waste pellets may be preferred, in order to dilute the combustible pellets with non-combustible material and to provide a vehicle to carry the pellets through asher 64 in continuous fashion. Product bin 67 is disposed near the outlet end of asher 64 for collecting and cooling ash and inert material mixture 68. Separator 70 disposed near an outlet of bin 67 collects mixture 68 from bin 67 and, through use of appropriately sized screening means 71 (typically $\frac{1}{4}$ to $\frac{1}{2}$ inch openings), separates ash and inert fines mixture 72 from selected large inert material particle sizes, which are cycled back to mixer 65. In solidification unit 74, mixture 72 is combined with appropriate amounts of cementitious and inert material to form a disposable solid as described above relative to unit 17 of FIG. 1.

High surface area packed bed 76 is disposed downstream of asher 64 for treating gaseous products of the oxidation of PMB waste pellets within asher 64. Bed 76 contains mineral agglomerates similar to that contained in bed 43 of the FIG. 2 device, and provides a large surface area for condensation of VOCs in the gaseous products from asher 64, permits further oxidation of the VOCs and limits flow of VOC droplets and particulate matter into HEPA filter 79 and VOC incinerator 80 downstream of and operatively connected to bed 76. In order to remove nitrogen oxides from the gaseous products from asher 64, $NO_x$ reducer 83 may be disposed downstream of incinerator 80. Both incinerator 80 and reducer 83 may be commercially available units (e.g., incinerator model as manufactured by Regenerative Environmental Equipment Co. (REECO), Morris Plains N.J., and reducer model as manufactured by Babcox & Wilcox Environmental Equipment Division, Barberton Ohio). In incinerator 80, the VOCs are converted to carbon dioxide and water, and nitrogen oxides may be converted to higher oxides. Reducer 83 converts nitrogen oxides within the off-gases to nitrogen and oxygen. The gaseous effluent from incinerator 80 and reducer 83 typically meets EPA air quality standards for release to the atmosphere.

Figure 5:
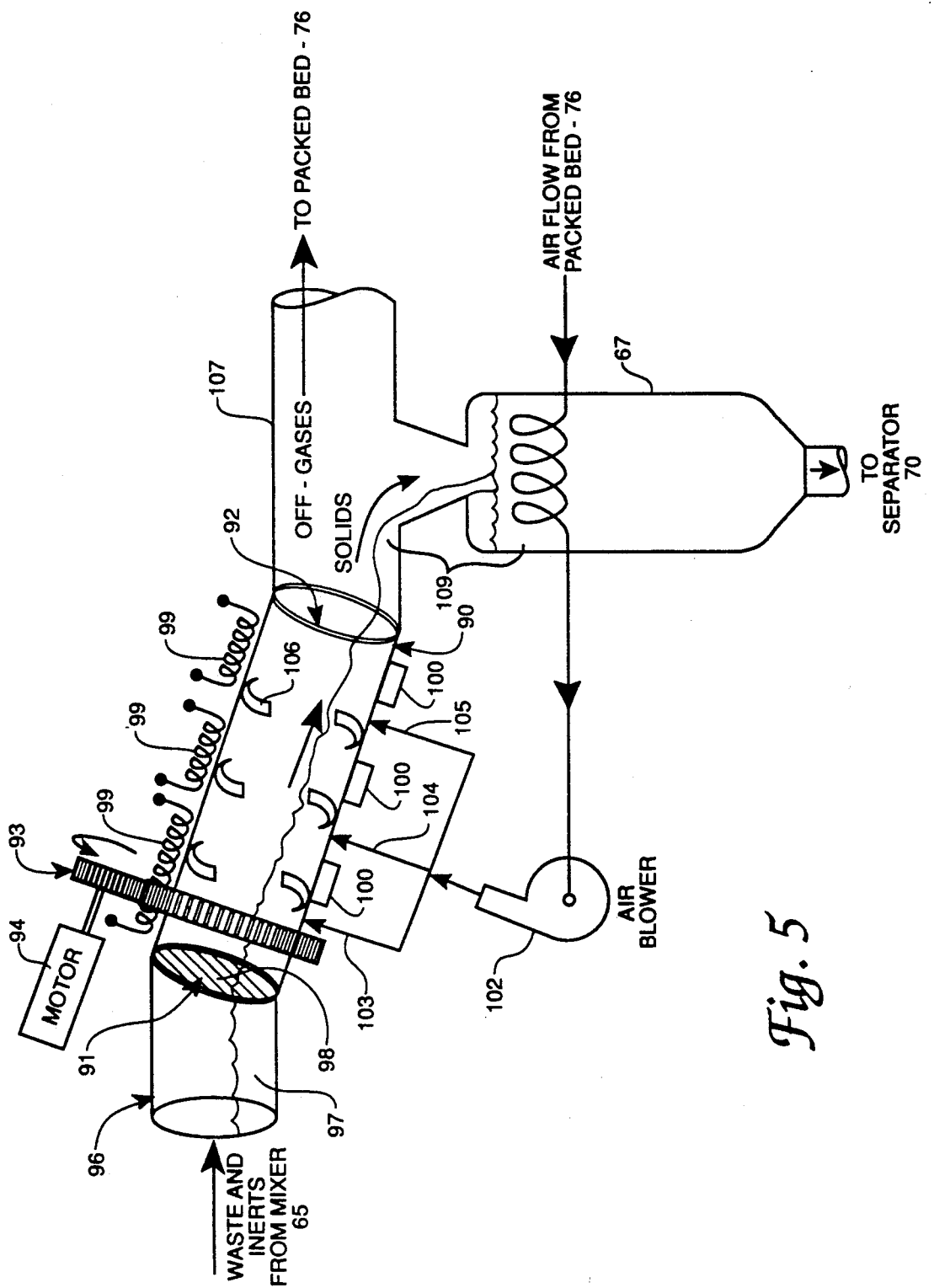
FIG. 5 is a view in axial section of a low temperature ashing device representative of the invention and configured for continuous operation in association with the FIG. 4 system.

Referring now to FIG. 5, shown therein is a view in axial section of asher 64 of FIG. 4 structured for substantially continuous operation. Asher 64 may comprise a rotatable, generally tubular housing 90 having an inlet 91 and outlet 92 and means 93 including motor 94 operatively connected thereto for controllably rotating housing 90. Feeder means 96 is disposed at inlet 91 of asher 64 to conduct mixture 97 of PMB waste and inert material from mixer 65 into asher 64, and includes airlock means 98 to prevent back flow of gaseous combustion products from asher 64. Housing 90 may be is inclined at any suitable angle (about 10° to 20°) in order to promote passage (as by tumbling) of mixture 97 through housing 90 in controlled fashion under the influence of gravity. Housing 90 is heated along its axial extent by suitable heaters 99 (resistance heaters or the like) connected to temperature monitors/controllers 100 to provide axially displaced regions of progressively higher temperature along the length of housing 90, the temperatures preferably corresponding to the ashing temperatures suggested by TGA of the waste. Accordingly, housing 90 may, for the ashing of PMB waste, have a temperature gradient therealong ranging from about 100° C. at inlet 91 to about 600° C. at outlet 92 and providing the selected ashing temperatures between inlet 91 and outlet 92. Other temperature ranges and selected temperatures may be appropriate for other organic waste types within the scope of the teachings hereof and of the appended claims. Heated air supplied from a source 102 thereof may be inserted into asher 64 at one or more distribution locations 103, 104,105 to promote efficient low temperature oxidation of the waste pellets within selected regions along housing 90. The inner surface of housing 90 may include a helical vane, corrugations or other means 106 to promote controlled tumbling of mixture 97 through housing 90 and to ensure sufficient retention time of the waste pellets within the heated regions of housing 90 for complete oxidation. Complete ashing of the waste pellets may therefore be achieved by suitable control of temperature axially along housing 90, of hot air distribution along housing 90 and of tumbling rate of mixture 97 along the length of housing 90. Receiver means 107 is disposed at outlet 92 of housing 90 for directing ash and inert mixture 109 to bin 67 and gaseous combustion products to packed bed 76 and VOC incinerator 80. Efficiency of operation of asher 64 may be promoted by flowing air from air source 111 through and in heat exchange relationship with packed bed 76 and bin 67 into source 102 and air inlets 103,104,105 as suggested most graphically in FIG. 4.

These teachings have been directed generally to oxidation and solidification of organic wastes comprising PMB materials contaminated with paint fines containing potentially toxic concentrations of metals. It should be noted however, as would occur to the skilled artisan guided by these teachings, that the equipment and method taught herein may apply to other solid waste types comprising predominantly non-hazardous combustible organic material including potentially toxic concentrations of metals, which solid wastes may include plastics, paper, wood or other material. The invention therefore contemplates within its scope the reduction of these other waste types with the object of retaining the toxic metals contained therein within the residual ash for solidification and disposal.

It is noted particularly in relation to the system shown in FIGS. 4 and 5, and to the method associated therewith, that the PMB waste material fed into asher 64 may within the contemplation of the invention be heated in the presence of air in order to oxidize the organic material in the waste, or be heated substantially in the absence of air in order to pyrolyze the waste. The continuously operating system represented by FIGS. 4 and 5 may have an additional advantage over the batch system represented by FIGS. 1 and 2 in that heating of the various regions of asher 64 may be substantially continuous during extended operation of system 60, whereas device 15 requires frequent heatup and cooldown in the course of batch operation.

The invention provides certain significant advantages over prior art methods for dealing with solidified painting wastes, including, substantial waste volume reduction, significantly lower solidification and stabilization costs, elimination of inert organic material in the solidified compact which contributes to superior chemical stabilization, and retention of the toxic metals in the solidified compact.

The invention therefore provides system and method for low temperature ashing of organic material in the consolidation of toxic metal concentrations therein into a disposable cementitious form. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for treating plastic media blasting paint waste material containing paint pigment including small concentrations of metals comprising:
   (a) means for forming said waste material into pellets of preselected size;
   (b) means defining a first bed of inert material;
   (c) means for mixing said pellets and said inert material in said first bed;
   (d) a source of heated air; and
   (e) means for passing said heated air from said source through said first bed with said pellets mixed therein at successively increased temperatures from about 200° C. to about 600° C. in order to reduce said pellets within said first bed to corresponding ash containing said metals.

2. The system of claim 1 further comprising means for collecting said ash and for combining said ash with cementitious material and binder to form a solidified compact for disposal.

3. The system of claim 1 further comprising means defining a second bed of inert material for treating gaseous oxidation products from said first bed.

4. The system of claim 3 further comprising incinerator means for burning said gaseous oxidation products for discharge to the atmosphere.

5. The system of claim 1 wherein said inert material is selected from the group consisting of blast furnace slag and crushed rock.

6. A system for treating plastic media blasting paint waste material containing paint pigment including small concentrations of metals comprising:
   (a) means for mixing said waste material in a first bed of inert material to form a dilute mixture of said waste material and said inert material of preselected composition ratio for controlled oxidation of said waste material within said mixture;
   (b) means for heating said mixture at successively increased temperatures from about 200° C. to about 600° C. in order to reduce said waste material within said mixture to corresponding ash containing said metals; and
   (c) means for combining said ash with cementitious material and binder to form a solidified compact for disposal.

7. The system of claim 6 further comprising means defining a second bed of inert material for treating gaseous oxidation products from said first bed.

8. The system of claim 7 further comprising incinerator means for burning said gaseous oxidation products for discharge to the atmosphere.

9. The system of claim 6 wherin said inert material is selected from the group consisting of blast furnace slag and crushed rock.

* * * * *